United States Patent
Funk et al.

(10) Patent No.: US 10,754,749 B2
(45) Date of Patent: *Aug. 25, 2020

(54) ASSESSMENT OF PROCESSOR PERFORMANCE METRICS BY MONITORING PROBES CONSTRUCTED USING INSTRUCTION SEQUENCES

(71) Applicant: International Business Machines Corporation, Armonk, NY (US)

(72) Inventors: Mark Robert Funk, Mantorville, MN (US); Aaron Christoph Sawdey, Cannon Falls, MN (US); Philip Lee Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,941

(22) Filed: Jul. 16, 2018

(65) Prior Publication Data

US 2018/0341567 A1    Nov. 29, 2018

Related U.S. Application Data

(63) Continuation of application No. 15/676,264, filed on Aug. 14, 2017, now Pat. No. 10,031,827, which is a
(Continued)

(51) Int. Cl.
*G06F 7/00* (2006.01)
*G06F 11/30* (2006.01)
*G06F 11/34* (2006.01)

(52) U.S. Cl.
CPC ...... *G06F 11/3089* (2013.01); *G06F 11/3409* (2013.01); *G06F 11/3414* (2013.01);
(Continued)

(58) Field of Classification Search
CPC .................. G06F 11/3089; G06F 11/3409
See application file for complete search history.

(56) References Cited

U.S. PATENT DOCUMENTS 6,243,387 B1   6/2001   Hjalmtysson et al.
6,959,265 B1   10/2005  Candela et al.
(Continued)

OTHER PUBLICATIONS

"U.S. Appl. No. 14/146,452 Office Action", dated Dec. 23, 2016, 5 pages.
(Continued)

*Primary Examiner* — Lam S Nguyen
(74) *Attorney, Agent, or Firm* — Mark Bergner (57) ABSTRACT

Systems, methods and computer program products assess processor performance metrics by monitoring probes constructed using instruction sequences. A first probe value can be determined from execution of a broad spectrum probe in an execution environment. In response to determining that the first probe value is not a first expected probe value, a targeted probe providing a second probe value directed to a subsystem of the execution environment, a feature of the subsystem, or a component of the execution environment is executed. In response to determining that the second probe value is not a second expected probe value, a differential between the second probe value and the second expected probe value can be used to determine that a bottleneck exists in at least one of the subsystem of the execution environment, the feature of the subsystem, or the component of the execution environment.

3 Claims, 4 Drawing Sheets

Related U.S. Application Data continuation of application No. 14/146,452, filed on Jan. 2, 2014, now Pat. No. 9,760,465.

(52) U.S. Cl.
CPC ...... *G06F 11/3428* (2013.01); *G06F 11/3466* (2013.01); *G06F 2201/865* (2013.01)

(56) References Cited

U.S. PATENT DOCUMENTS

| | | | |
|---|---|---|---|
| 7,490,073 | B1 | 2/2009 | Qureshi et al. |
| 7,895,320 | B1 | 2/2011 | Oggerino et al. |
| 8,589,354 | B1 | 11/2013 | Roche et al. |
| 8,719,561 | B2 | 5/2014 | Francois et al. |
| 8,793,482 | B2 | 7/2014 | Francois et al. |
| 2004/0216113 | A1 | 10/2004 | Armstrong et al. |
| 2009/0293051 | A1 | 11/2009 | Krywaniuk |
| 2010/0042337 | A1 | 2/2010 | Schnell |
| 2010/0287561 | A1 | 11/2010 | Floyd et al. |
| 2012/0246447 | A1 | 9/2012 | Bishop et al. |
| 2012/0266143 | A1 | 10/2012 | Bhoovaraghavan et al. |
| 2015/0186241 | A1 | 7/2015 | Funk et al. |
| 2015/0186242 | A1 | 7/2015 | Funk et al. |
| 2016/0006640 | A1 | 1/2016 | Masuda et al. |
| 2017/0364429 | A1 | 12/2017 | Funk et al. |

OTHER PUBLICATIONS

"U.S. Appl. No. 14/305,196 Office Action", dated Sep. 30, 2015, 6 pages.

Crowe, "NovAtel's Novel Approach to CPU Usage Measurement", Software—Practice and Experience, vol. 21(5), 465-477, May 1991, 13 pages.

Hiarkema, et al., "Performance Monitoring of Java Applications", ACM ISBN 1-1-58113-563-7, 2002, 14 pages.

Kunkel, et al., "A Performance Methodology for Commercial Servers", IBM J. Res Develop. vol. 44 No. 6, Nov. 2000, 22 pages.

Phansalkar, et al., "Measuring Program Similarity: Experiments with SPEC CPU Benchmark Suites", IEEE 0-7803-8965-4/05, 2005, 11 pages.

Westermann, et al., "Towards Performance Prediction of Large Enterprise Applications Based on Systematic Measurements", Proceedings of the Fifteenth International Workshop on Component-Oriented Programming (WCOP), SAP Research, Vincenz-Priessnitz-Strasse 1, 76131 Karlsruhe, Germany, 2010, 8 pages.

Woodside, et al., "The Future of Software Performance Engineering", IEEE Computer Society, Future of Software Enginerring, 2007, 17 pages.

Canfora et al., "A Lightweight Approach for QoS-Aware Service Composition," Proceedings of the 2nd International Conference on Service Oriented Computing, 2004, pp. 1-10. www.rcost.unisannio.it/mdipenta/papers/tr-qos.pdf.

Cockcroft, A., "Utilization is Virtually Useless as a Metric!" Paper, CMG06: 32nd International Computer Measurement Group Conference, 2006, pp. 1-6.

Cockcroft, A., "Utilization is Virtually Useless as a Metric!" 18th International Workshop on High Performance Transactions Systems (HPTS), 2019, pp. 1-14.

"Intel Performance Tuning Utility 4.0 Update 5," Intel Developer Zone, Printed: Oct. 2, 2019, 4 pages.

"Application Code probes," Lotus Domino Administration 7 Help, Printed: Dec. 23, 2019, 2 pages. http://www-12.lotus.com/ldd/doc/domino_notes/7.0/help7_admin.nsf/f4b82fbb75e942a6852566ac0037f284/e06e0363c335b8918525706f0065e8cf?OpenDocument.

ASSESSMENT OF PROCESSOR PERFORMANCE METRICS BY MONITORING PROBES CONSTRUCTED USING INSTRUCTION SEQUENCES

RELATED APPLICATIONS

This application is a Continuation of, and claims the priority benefit of, U.S. patent application Ser. No. 15/676,264 filed Aug. 14, 2017 which is a Continuation of, and claims the priority benefit of, U.S. patent application Ser. No. 14/146,452 filed Jan. 2, 2014.

BACKGROUND

Embodiments of the inventive subject matter generally relate to the field of computer systems, and, more particularly, to assessment of processor performance metrics in computer systems by monitoring probes constructed using instruction sequences.

Assessing performance of workloads on computing systems can be an important part of the testing and day-to-day operation of workloads. Traditionally such assessments are accomplished through liberal use of hardware performance instrumentation ("performance counters") whose data must be collected and analyzed while customer workloads are running. In previous approaches, significant expense can be incurred not only at system design due to the inclusion of counter and event qualification logic in hardware designs, but in execution at customer sites for counter configuration, data collection, and performance analysis. Further, the measurements (and thus the performance analysis) can be greatly affected by factors such as logical partitioning, power management policies in effect at the time measurements are taken, operating system policies, variety of customer workloads being processed, and a multitude of hardware configurations that are possible. In conventional performance benchmarking, such factors are tightly controlled so that they do not impact the benchmark. However, the benchmark results do not necessarily reflect real world conditions which typically are affected by logical partitioning, power management policies in effect at the time measurements are taken, operating system policies and customer workloads.

Another common approach to hardware performance metrics is to simply measure time. This measurement is often called "CPU Utilization." While easy to collect, it can be prone to inaccuracies when applied to metrics such as computational capacity, resource consumption, or work performed.

SUMMARY

Various embodiments are disclosed for assessing processor performance metrics by monitoring probes constructed using instruction sequences. A first probe value can be determined from execution of a broad spectrum probe in an execution environment. In response to determining that the first probe value is not a first expected probe value, a targeted probe providing a second probe value directed to a subsystem of the execution environment, a feature of the subsystem, or a component of the execution environment is executed. In response to determining that the second probe value is not a second expected probe value, a differential between the second probe value and the second expected probe value can be used to determine that a bottleneck exists in at least one of the subsystem of the execution environment, the feature of the subsystem, or the component of the execution environment.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The embodiments are directed to lightweight instruction sequence probes that produce values that can be used to determine resource usage and system capacity while a system is in use. The instruction sequence probe can include instruction sequences that are tailored to exercise system components such as processors, memory etc. During the probe's execution, the probe measures one or more hardware metrics. The resulting value of the measurement can be compared to previous probe values to produce a differential value that can be used to determine system resource usage and system capacity.

Figure 1:
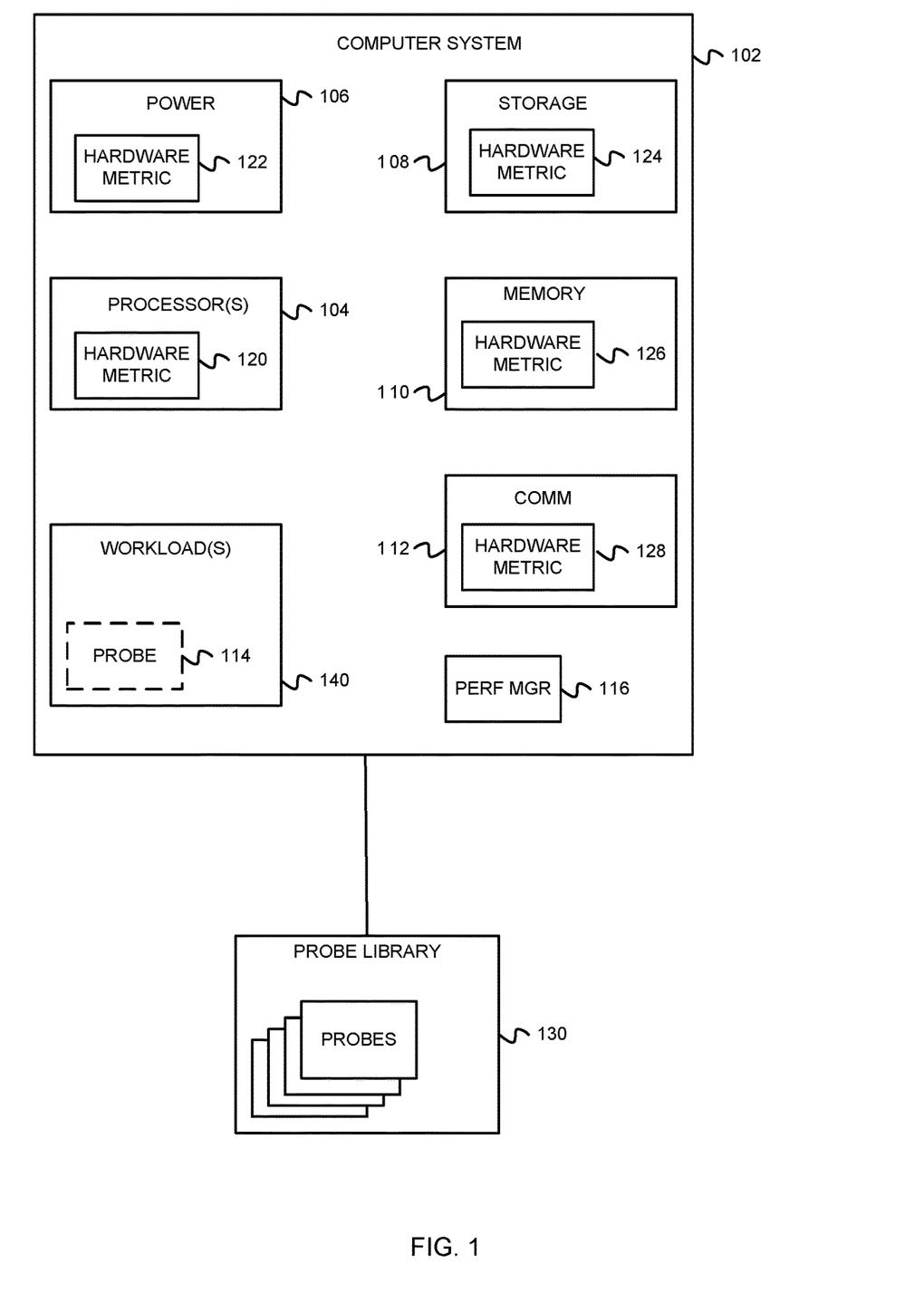
FIG. 1 is a block diagram illustrating a system including instruction sequence probes according to embodiments.

FIG. 1 is a block diagram illustrating a system 100 including instruction sequence probes. In some embodiments, system 100 includes a computer system 102, performance manager 116 and probe library 130. Computer system 102 may include processors 104, memory 110 and power subsystem 106. Computer system 102 may optionally include storage subsystem 108 and communication subsystem 112. Processors 104 may include one or more processors, including processors with multiple cores, multiple nodes, and/or processors that implement multi-threading. In some embodiments, processors 104 may include simultaneous multi-threaded processor cores. Processors 104 may maintain performance metrics 120 that may include various types of data that indicate or can be used to indicate various performance aspects of processors 104. Performance metrics 120 may include counters for various events that take place on the processors or on individual processor cores on a processor. For example, a processor may have architected registers that maintain counts of instructions, floating point operations, integer operations, on-processor cache hits and misses, pipeline stalls, bus delays etc. Additionally, time may be a performance metric. Registers or other data locations or functions that maintain a time value may be used as a performance metric in some embodiments.

Memory 110 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). A memory controller for memory 110 may maintain performance metrics 126 that may include various types of data that indicate or can be used to derive indicators of memory performance. For example, memory performance metrics 126 may include counter for the number of memory accesses, type of accesses (e.g., read or write access), cache hits, cache misses etc.

Power subsystem 106 provides and regulates power to the various components of computer system 102. Power subsystem 106 may maintain performance metrics 122 that comprise voltage levels for various rails of one or more power supplies in power subsystem 106.

Storage subsystem 108, when present, provides persistent storage for computer system 102. Such storage can include hard disks, a random access memory (RAM), optical storage devices, magnetic storage devices, solid state drives, or any suitable combination of the foregoing. Storage subsystem 108 may maintain performance metrics 124 that may include counts of read or write accesses, or timing information related to reads, writes and seeks.

Communication subsystem 112, when present, provides network communication functions for computer system 102. Communication subsystem 112 may maintain performance metrics 128 that may include counts of packets transmitted and received and other data regarding network communications. In some embodiments, communication subsystem 112 may include a network interface (e.g., an ATM interface, an Ethernet interface, a Frame Relay interface, SONET interface, wireless interface, etc.)

Computer system 102 may be configured to process workloads 140. A workload 140 is a set of tasks that computer system 102 has been requested to perform via one or more applications or services running on computer system 102. Different workloads may have different characteristics. For example, OLTP (On-Line Transaction Processing) workloads typically involve many data entry or retrieval requests that involve many short database interactions. Data mining workloads on the other hand have few interactions with users, but more complicated and lengthy database interactions. Different types of workloads 140 may have different impacts on the resources of computer system 102.

Probe 114 can be a lightweight thread that includes an instruction sequence designed to measure one or more hardware metrics during its operation. In some embodiments, a probe may be custom designed for a particular hardware implementation. For example, a probe may include instructions that measure hardware metrics for a particular family of processors or memory subsystems. Probe 114 may be inserted (i.e. added) into a workload 140 to measure the impact on the resources of computer system 102 of workload 140.

Performance manager 116 controls the insertion of probes 114 into workloads 140. In some implementations, one or more probes 114 may be inserted into workloads at periodic intervals. In other implementations, probes may be inserted into workloads upon the occurrence of particular events. In further implementations, a probe 114 may be inserted into a workload upon request of a user or administrator.

Probe library 130 may maintain different types of probes 114. A user or administrator may select one or more probes from probe library 130 for use on computer system 102. Additionally, performance manager 116 may select probes from probe library 130 in response to events on computer system 102. Probe library 130 may be part of computer system 102, or it may be maintained on a separate system that is available to computer system 102.

In addition to the components illustrated in FIG. 1, computer system 102 may also include a bus (e.g., PCI, ISA, PCI-Express, HyperTransport®, InfiniBand®, NuBus, etc.) that couples some or all of the components illustrated in FIG. 1.

Any of the functionalities described herein may be partially (or entirely) implemented in hardware and/or on the processor 104. For example, the functionality may be implemented with an application specific integrated circuit, in logic implemented in processor 104, in a co-processor on a peripheral device or card, etc. Further, realizations may include fewer or additional components not illustrated in FIG. 1 (e.g., video cards, audio cards, additional network interfaces, peripheral devices, etc.).

Figure 2:
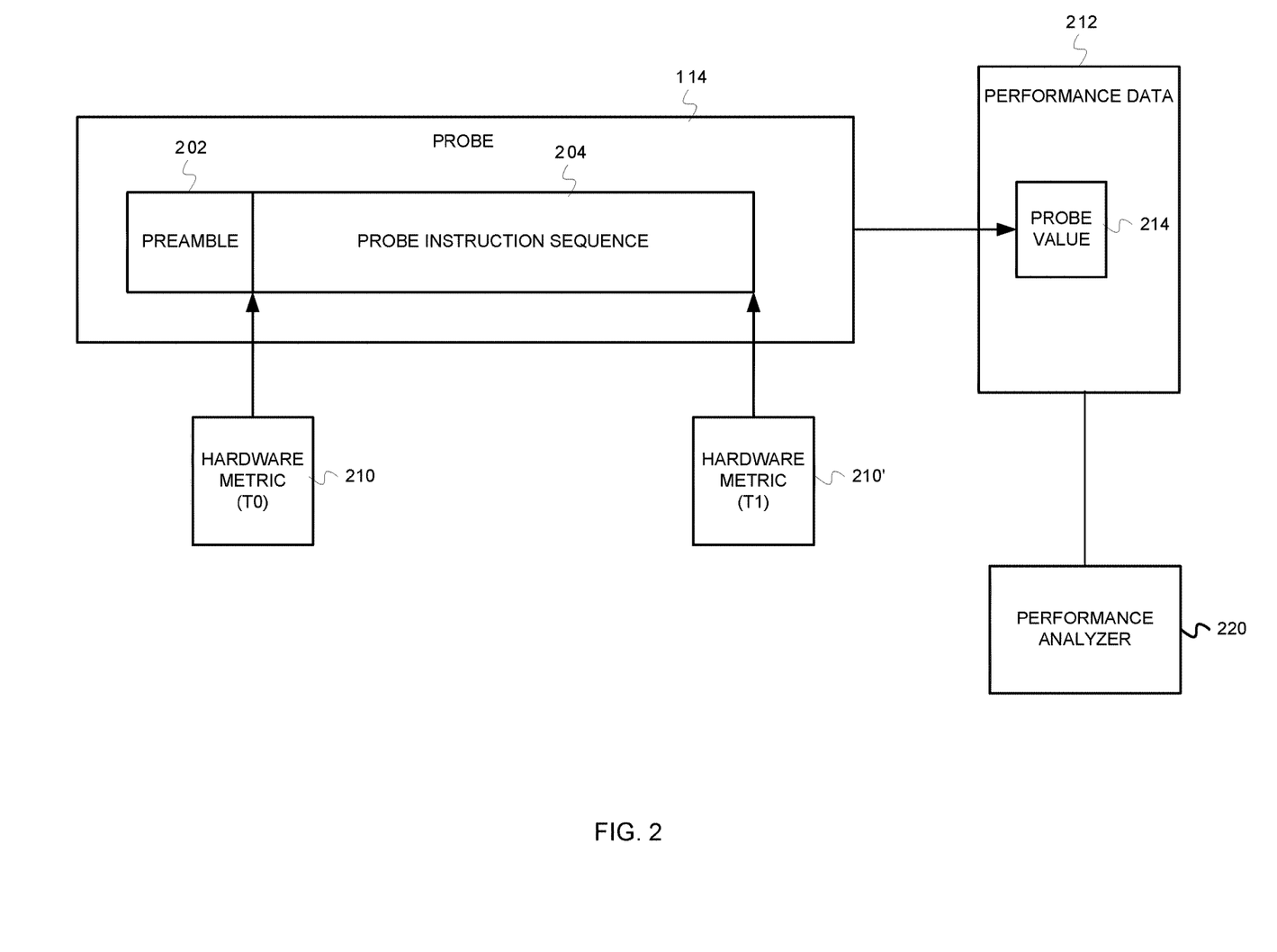
FIG. 2 is a block diagram illustrating an instruction sequence probe.

FIG. 2 is a block diagram illustrating an instruction sequence probe 114 according to example embodiments. Probe 114 may include a preamble 202 and an instruction sequence 204. Preamble 202 comprises initialization code or other code that is to be performed prior to any measurements being taken by probe 114. For example, a probe whose measurements may be affected by cache hits or misses may include a preamble 202 that warms the cache lines prior to any measurements. A "warm" cache is a cache that has been populated with entries from one or more recently run processes, threads or tasks. It may be desirable to warm a cache in order to avoid skewing probe values due to the increase in time it takes for the system to populate the cache as processes are initialized, swapped, etc. In other cases, data structures may be initialized by preamble 202. In some embodiments, probe 114 can be implemented as a thread that is inserted in a workload. However, the embodiments are not limited to threads and in alternative embodiments probe 114 can be a process or task.

Instruction sequence 204 comprises a set of processor executable instructions. An instruction sequence 204 may be designed using knowledge of a system, the hardware in the system, the types of workloads that are expected to be run by customers, and the resources used by those workloads. Various types of probes may exist, and the instruction sequence 204 for a particular probe may vary depending on the type of probe. For instance, a probe may be a broad spectrum probe that includes an instruction sequence 204 that generally exercises various resources (processor, memory, cache, instruction pipelines etc.). Alternatively, a broad spectrum probe may include an instruction sequence 204 that is constructed to approximate a response curve of a customer workload, where the response curve may represent customer expectations for response of the workload. An instruction sequence 204 may be designed based on the characterization of input load and desired throughput of the workload. Further, the instruction sequence may take into account any special instructions that may be executed as part of the workload.

Further, probes may exist that target particular subsystems. As an example, a probe may target a processor, a power subsystem, a memory subsystem, a communications subsystem, or a storage subsystem. In such a targeted probe, the instruction sequence may be designed to exercise the targeted subsystem or features of the targeted subsystem. Additionally, probes may target components of a subsystem. For example, a probe may target a processor core. Also, probes may target components such as a cache (e.g., an L1, L2 or L3 cache), floating point unit, BHT (Branch History Table), vector processing units, cache read/claim machines, instruction pipelines etc. of a processor or processor core. The instruction sequence may be designed to exercise the particular component or features of the particular component. Those of skill in the art having the benefit of the disclosure will appreciate that the probes of the various embodiments are not limited to any particular component, subsystem or subcomponent of a computer system.

In some embodiments, an instruction sequence 204 may be manually constructed. In alternative embodiments, an instruction sequence 204 may be automatically created. For example, it is common during design of a hardware system to use Architecture Verification Programs (AVPs) and Performance Verification Programs (PVPs). An instruction sequence 204 may be automatically designed using some or all of the code of an AVP or PVP.

Upon insertion into a workload, probe 114 executes preamble 202 instructions, if any. Prior to execution of instruction sequence 204 (time=T0), probe 114 may take an initial measurement of performance metric 210. In some embodiments, performance metric 210 may be any of performance metrics 120-128 described above with reference to FIG. 1. Further, performance metric 210 may be a timer or clock value. Probe 114 may measure more than one type of performance metric 210.

Probe 114 then executes instruction sequence 204. After execution of instruction sequence 204 has finished executing (time=T1), probe 114 again measures performance metric 210'. The difference between the values of performance metric 210 and 210' represents performance data associated with execution of the instruction sequence and any processes or threads associated with currently executing workloads. The performance data as determined by the probe may be stored as a probe metric 214 in a database as performance data 212. Performance data 212 can include a history of probe metrics from the various types of probes that may be inserted into a workload 140.

Performance analyzer 220 can receive performance data 212 and use the data to determine performance attributes of a system. In some embodiments, performance analyzer 220 can determine differential data using values of probe metric 214 from different points in time. For example, a first value of probe metric 214 may comprise a value that was determined when there was no workload executing on computer system 102. The first value may be considered an expected value. Alternatively, an expected value may be set by repeatedly executing the probe during a customer workload. The resulting probe values may be stored, and a minimum probe value (or maximum probe value) may be selected as an expected value for the probe. For example, selecting a minimum value for the expected probe value may be appropriate when probe execution time is the metric being measured. A minimum value for time is appropriate because it is likely that external factors such as logical partitioning, task swapping etc. are not affecting the time measurement. A maximum probe value may be appropriate if a counter such as instructions per second (IPS) is the metric produced by the probe. Again, a maximum value is appropriate because external noise is not likely to be a factor when a high IPS is achieved.

After an expected value for the probe has been established, probe 114 can be executed during a workload. The subsequent executions of a probe 114 can provide a probe value 214 that can be compared with the expected value or with previous probe values 214 to produce a differential value. The differential value can then be used as a basis for evaluating various performance aspects of computer system 102.

Figure 3:
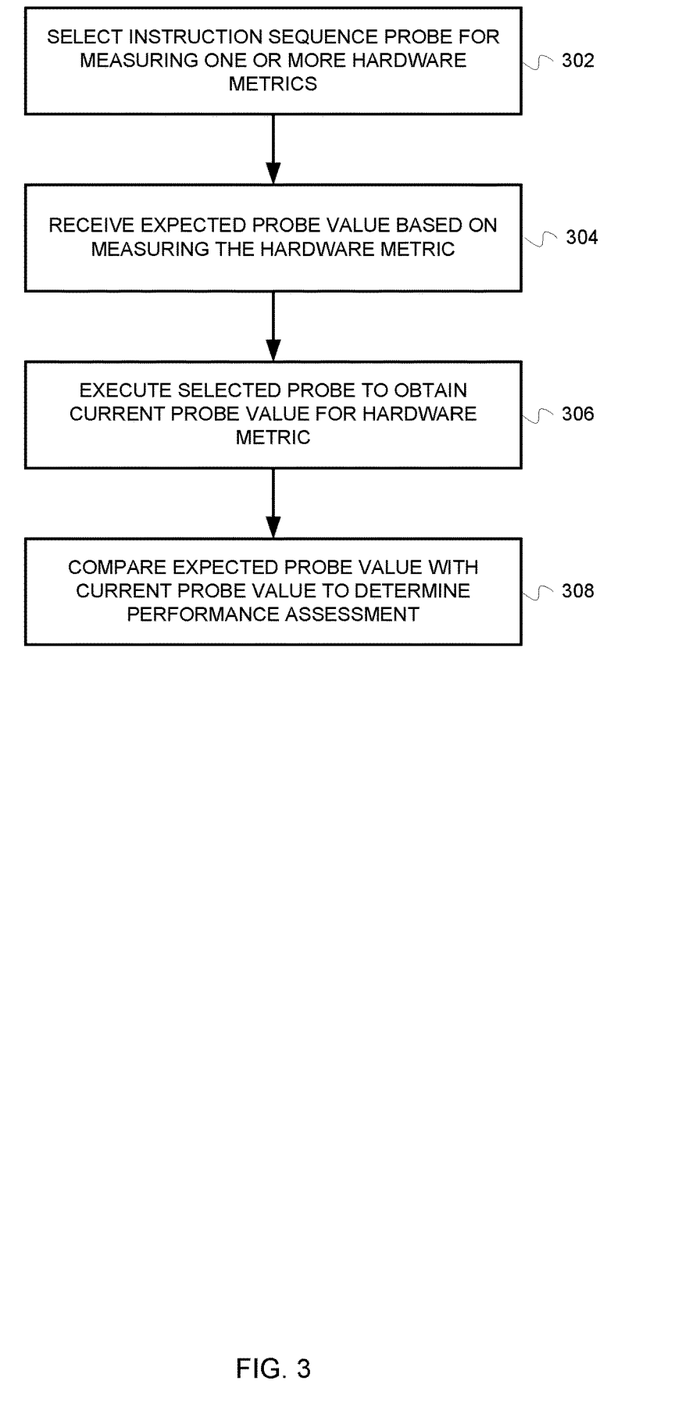
FIG. 3 is a flowchart illustrating a method for utilizing instruction sequence probe according to embodiments.

Further details on the operation of the above described system 102 and probe 114 will now be provided with reference to FIG. 3.

FIG. 3 is a flowchart illustrating a method 300 for determining system performance characteristics utilizing instruction sequence probes according to embodiments. Method 300 begins at block 302 with selecting a probe for measuring one or more hardware metrics. The probe may be selected in various ways. For example, a user or system administrator may select a probe for execution. Alternatively, probes may be scheduled for execution at periodic intervals. The particular interval may depend on the metric being measured and whether a broad spectrum probe is used or whether targeted probes are used. For example, a broad spectrum probe may be run at one minute intervals, while a targeted probe may run at millisecond intervals. The embodiments are not limited to any particular interval. It is desirable to determine an interval that is sufficiently long to provide for efficient differential measurement of expected probe value and current probe values. Further, a probe may be selected for execution in response to an event. For example, as described below, a targeted probe may be executed in response to a broad spectrum probe returning a value that deviates from an expected value.

At block 304, a performance analyzer receives an expected value for the selected probe. The expected value may be determined in various ways. In some implementations, the expected value for a probe may be determined by executing the probe in a first environment for a computer system to obtain a probe value associated with one or more hardware metrics. The first environment may comprise an environment in which no other workloads are executing on computer system 102, thus resulting in no contention for resources between the selected probe and workloads. The probe value resulting from executing the probe in this environment may be saved as the expected value for the selected probe.

In alternative embodiments, the probe may be run multiple times during the execution of workloads and a histogram of probe values may be maintained. As discussed above, the probe value in the minimum value or maximum value bin of the histogram may be used as an expected value for the probe. Utilizing the minimum or maximum value bin of the histogram can be useful in removing effects of operating system task swaps, page faults, and partition swaps.

At block 306 the selected probe is executed in a current workload environment to obtain a current probe value for associated with one or more hardware metrics.

At bock 308, the current probe value is compared with the expected value of the probe value received at block 304. The comparison can be used to determine a performance assessment of the current workload environment on computer system 102. For example, if the comparison determines that the expected value of the selected probe is the same or nearly the same as the current probe value, then it can be determined that there is little to no load in the current workload environment and that significant processing capacity remains in the current environment. Further, in embodiments where a customer is charged for workload processing, the customer may receive a full charge for the current workload.

If the expected probe value is different from the current probe value, then capacity estimates and accounting charges can be adjusted based on a ratio between the current probe value and the expected probe value. For example, in cases where the probe value comprises an "instructions per second" (IPS) metric, the IPS value resulting from the current probe can be compared with the expected IPS to determine how much capacity remains in computer system 102.

As discussed above, in some embodiments, an instruction sequence for a single probe may be designed to model the response curve for a workload. In alternative embodiments, multiple probes targeting multiple hardware components may be used to model a response curve for a workload. In such embodiments, method 300 above may be performed for each of the probes that model the response curve for a workload. For example, the multiple probes can be executed, and the expected values produced by the multiple probes can be compared to corresponding expected values for the probes. The differential values produced by the comparison can be used as described above regarding block 308 to determine a performance assessment for the system.

In further alternative embodiments, sequences of probes may be inserted into a workload. The resulting probe values for the probes in the sequence may be cross correlated with expected values for the sequence of probes to assess the performance of a system. In such embodiments, a series of targeted probe executions may be used and analyzed to establish expected values that are calibrated to response curves for characterization workloads.

Additionally, as noted above, probes may be run multiple times during execution of workloads on a system. A histogram or other history data may be maintained that stores the results of the probe runs. The variation in expected values in the histogram may be used to determine stability of the workloads running on a particular system. Further, the histogram or other history data may be used to identify hardware that is not making a significant contribution to processing a workload. Such hardware may be removed or eliminated in future systems that run the same or similar workloads. Additionally, as probes are run over time, a statistical correlation between the return values of various probes and the actual workload a customer is performing can be performed. The statistical correlation can be used to select probes that accurately model the customer's workload. The selected probes can then be executed to determine how much capacity is left in a system to perform additional workloads similar to those that a customer is currently executing. Thus rather than analyzing a system over long periods of time as is done in traditional systems, the probes of the embodiments can be used to produce an accurate result in a short amount of time.

In some embodiments, information from a workload may be used in conjunction with execution of various type of probes may be used to determine a correlation between probe values and workload performance. For example, in transaction oriented systems, the number of transaction may vary at different points in time or at different points in the execution of a workload. A peak transaction load can be correlated with probe execution data to determine how much capacity remains above the peak transaction load.

As can be seen from the above, the method 300 for assessing performance of a system in some embodiments can actively measure performance by inserting probes into active workloads to exercise or stress resources and measure hardware metrics that result from the exercise of the resources. This can be distinguished from traditional performance assessment which passively determines resource stress.

Figure 4:
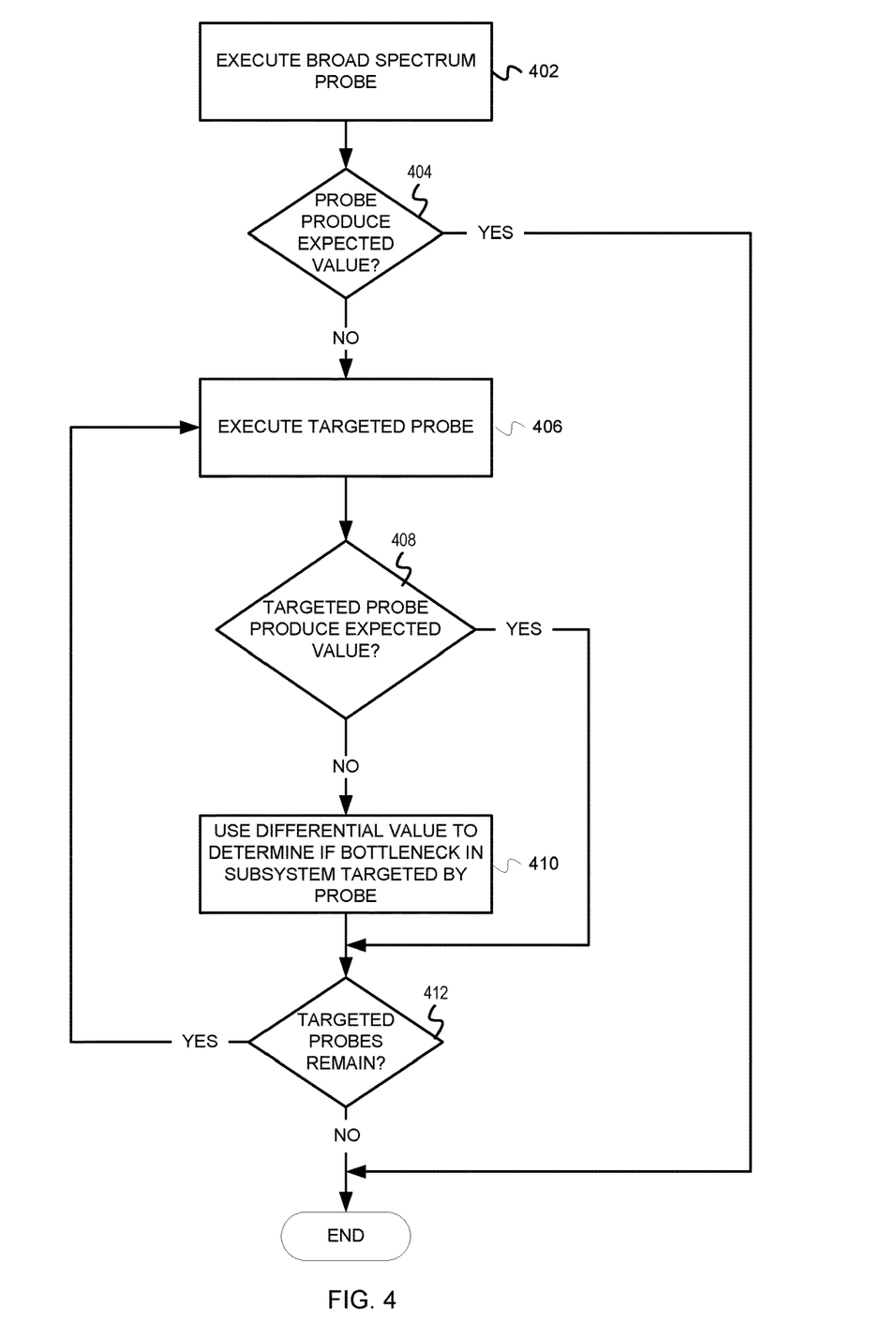
FIG. 4 is a flowchart illustrating a method for identifying system bottlenecks according to embodiments.

FIG. 4 is a flowchart illustrating a method 400 for identifying system bottlenecks according to embodiments. At block 402, a broad spectrum probe is executed. As discussed above, a broad spectrum probe may be one that measures a general hardware metric such as execution time for the probe or an instruction counter for the probe.

At block 404, a check is made to determine if the broad spectrum probe returned an expected value. If the broad spectrum probe returned an expected value, then the method terminates. Return of the expected value indicates that there is no bottleneck in any of the system resources (memory, cache, processors etc.).

Blocks 406-412 are a loop that executes targeted probes to identify a bottleneck in a particular subsystem or component. If the check at block 404 determines that the broad spectrum probe did not return an expected value, then at block 406, a targeted probe may be executed. As discussed above, a targeted probe is one that is directed to a particular subsystem, component or feature of a subsystem. For example, a targeted probe may exercise a processor, cache, communications link etc. The targeted probe measures at least one hardware metric associated with the targeted subsystem, component or feature.

At block 408, a check is made to determine if the targeted probe returned an expected value. If the targeted probe returned an expected value, then the method proceeds to bock 412. If the targeted probe did not return an expected value, then at block 410, the differential between the expected value and the value actually returned by the targeted probe can be used to determine if a bottleneck exists in the subsystem, component or featured targeted by the probe.

At block 412, the system determines if further targeted probes remain to be executed. If so, the method returns to block 406 to execute a remaining targeted probe.

While the above described systems and methods have been described in the context of an operating system that executes a performance analyzer to assess performance of a system during the execution of workloads, the embodiments are not so limited. For example, a hypervisor may inject probes into a virtual machine (i.e., a logical partition) to assess the performance of the virtual machine. Alternatively, a user level program may select probes for execution to determine whether the system has capacity for increases resource usage. For example, a user may wish to know if the system has capacity to execute more floating point operations than are currently being executed. A probe can be executed that exercises the floating point unit. If the resulting probe value matches the expected value, then there is more capacity for floating point operations.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for assessing processor performance metrics using monitoring probes constructed from instruction sequences as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for assessing computer system performance, the method comprising:
   receiving a first probe value determined from execution of a broad spectrum probe in an execution environment;
   in response to determining that the first probe value is not a first expected probe value, initiating execution of a targeted probe, the targeted probe providing a second probe value associated with the system, wherein the second probe value is based, at least in part, on at least one system metric; and
   in response to determining that the second probe value is not a second expected probe value, determining, based at least in part, on a differential between the second probe value and the second expected probe value that a system bottleneck exists.

2. The method of claim 1, wherein the system includes at least one member of the group consisting of a memory, a processor, a floating point unit, a vector processing unit, a storage unit, a cache, and a communications link.

3. The method of claim 1, wherein the first probe value comprises an execution time for the broad spectrum probe or an instruction counter for the broad spectrum probe.

* * * * *